United States Patent
Hatch

[11] 4,027,183
[45] May 31, 1977

[54] LIQUID-GAS PHASE SEPARATION FOR SELF-CONTAINED LIQUID METAL CURRENT COLLECTORS

[75] Inventor: Burton D. Hatch, Saratoga, N.Y.

[73] Assignee: General Electric Company, Schenectady, N.Y.

[22] Filed: Oct. 23, 1975

[21] Appl. No.: 625,130

[52] U.S. Cl. .................................. 310/219; 310/178
[51] Int. Cl.² ........................................ H02K 13/00
[58] Field of Search ............... 310/219, 178, 232; 55/36, 159; 318/253; 342/48

[56] References Cited

UNITED STATES PATENTS

| | | | |
|---|---|---|---|
| 1,184,224 | 5/1916 | Breslauer | 310/178 |
| 1,635,319 | 7/1927 | Gill | 310/178 |
| 2,828,431 | 3/1958 | Klaudy | 310/178 |
| 2,869,007 | 1/1959 | Ringland | 310/178 |
| 3,191,082 | 6/1965 | Csillag | 310/219 |
| 3,293,470 | 12/1966 | Polgreen | 310/178 |
| 3,312,843 | 4/1967 | Krulls | 310/178 |
| 3,436,575 | 4/1969 | Harvey | 310/219 |
| 3,444,408 | 5/1969 | Krulls | 310/178 |
| 3,453,467 | 7/1969 | Harvey | 310/178 |
| 3,546,508 | 12/1970 | Harvey | 310/219 |

*Primary Examiner*—R. Skudy
*Attorney, Agent, or Firm*—Marvin Snyder; Joseph T. Cohen; Jerome C. Squillaro

[57] ABSTRACT

Separation of gas from an emulsion of gas and liquid metal in an acyclic machine is achieved during high speed machine operation, without removing the emulsion from the current collector vicinity, by allowing the emulsion to flow into a central fluid chamber situated radially inward of the current collector gap. Rotation of the central fluid chamber centrifugally separates the entrained gas from the liquid metal. The liquid metal thus freed of gas is returned to the collector gap.

5 Claims, 1 Drawing Figure

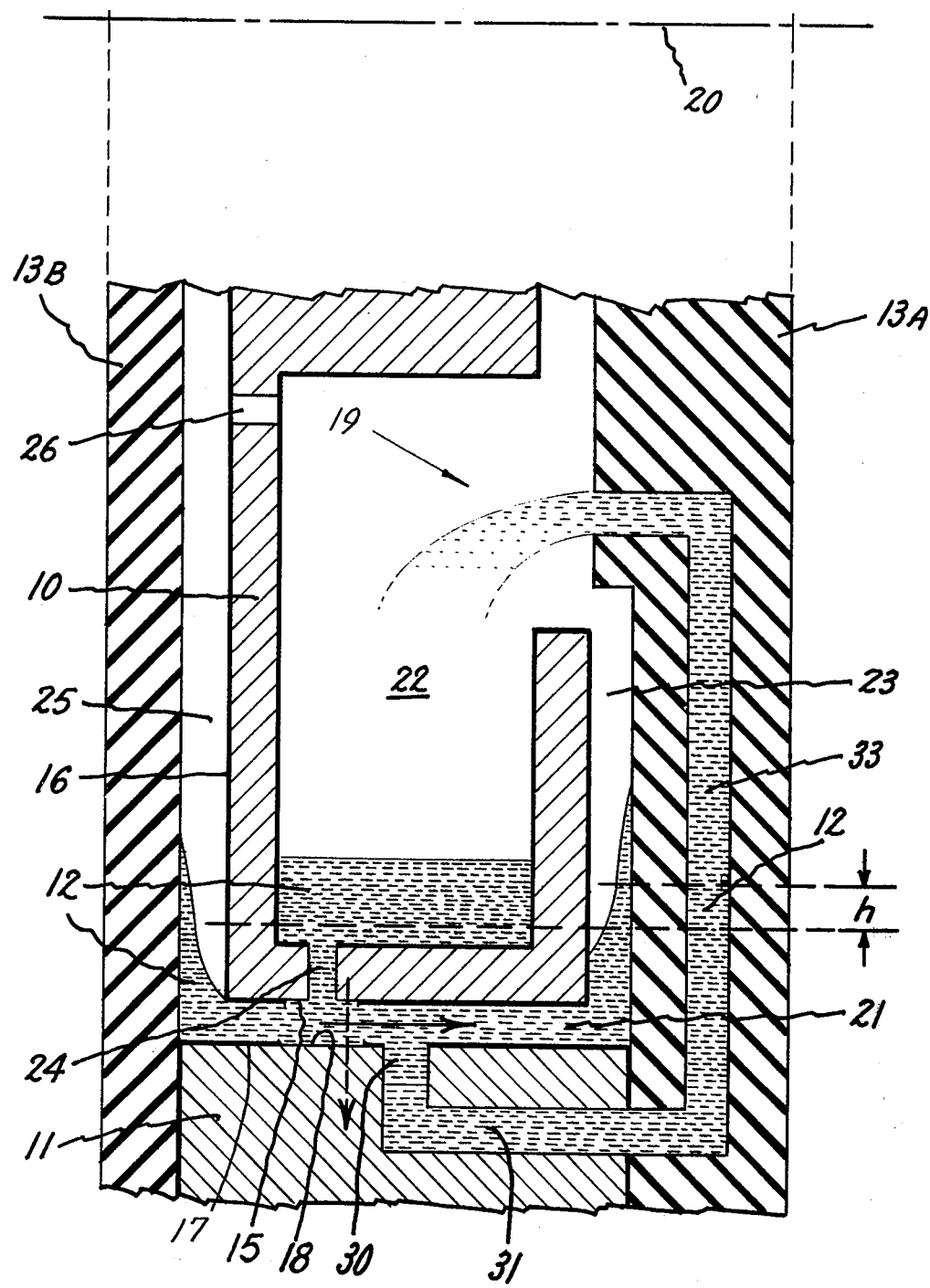

LIQUID-GAS PHASE SEPARATION FOR SELF-CONTAINED LIQUID METAL CURRENT COLLECTORS

INTRODUCTION

This invention relates to liquid metal current collectors for acyclic machines, and more particularly to a method and apparatus for separating entrained cover gas from liquid metal employed as a current collector.

In an acyclic machine using liquid metal collectors instead of solid brushes, the liquid metal collectors are employed to carry the armature current. An acyclic generator of this type is described and claimed in L. M. Harvey U.S. Pat. 3,211,936, issued Oct. 12, 1965 and assigned to the instant assignee. A reservoir in the machine contains a charge of liquid metal, such as sodium-potassium or gallium, and a cover gas that is advantageously inert, such as nitrogen for example, thus ensuring an adequate supply of liquid metal to the collector while yet not flooding or filling the entire space between the stator and rotor with liquid metal.

Whenever peripheral speed of a liquid metal current collector in an acyclic motor or generator is sufficiently high to result in nonlaminar (i.e., turbulent) flow and ingestion of the cover gas into the liquid metal, an emulsion or gas-liquid phase mixture occurs. At very high speeds, this mixture can develop into a heavy foam and ultimately into a paste-like composition. As the gas content of the liquid metal increases, electrical conductivity of the liquid metal mixture diminishes. Therefore, to obtain efficient and dependable current collector electrical performance, it is necessary to separate the emulsion, or phase mixture, as completely as possible, into its pure gas and purified liquid metal phases so that the purified liquid metal may be returned to the electrical current collector site where it may then serve as an electrical brush between a collector ring on the machine rotor and a stationary collector ring on the stator, thus completing that portion of the armature current circuit of the machine.

In the development of acyclic machines, such as electrical generators, employment of liquid metal as electrical current collectors in place of collector rings with carbon or composite brushes has required, inter alia, removing the ingested gas and liquid metal mixture from a number of locations around each collector ring, piping this mixture outside of the machine (usually axially through the end-bell thereof to a phase separation chamber or device), cooling the liquid metal and the gas, and returning, by separate piping, the purified and cooled liquid metal to the locations around the collector ring from which it had been removed as a phase mixture. The complexity and cost of separating the gas from the liquid by removing the emulsion or phase mixture from the collector and separately cooling and separating the gas and liquid are clearly undesirable.

Accordingly, one object of the invention is to provide simple and compact apparatus for separating entrained gas from the liquid metal of the current collector assembly of an acyclic machine and returning the purified liquid metal to the current collector site thereof.

Another object is to provide a method and apparatus for removing, entirely within the interior of an acyclic machine, entrained gas from the liquid metal of the collector assembly of such machine.

Another object is to provide a method and apparatus for removing entrained gas from the liquid metal of the collector assembly of an acyclic machine which allow simplified cooling of the liquid metal.

Briefly, in accordance with a preferred embodiment of the invention, a liquid-gas phase separator for removing ingested gas from liquid metal in the liquid metal current collector of an acyclic machine comprises a rotor current collector ring enclosing a fluid chamber therein, and a housing surrounding the rotor current collector ring and spaced apart therefrom by a predetermined gap. A first passageway formed by the gap extends radially along one entire side of the chamber to a location opening into the chamber. An opening in the radially-outermost circumferential region of the rotor current collector ring permits liquid communication between the interior region of the chamber and a circumferential, second passageway formed by the gap between the housing and the rotor collector ring. A third passageway is formed in the housing to permit flow of liquid metal from the circumferential passageway to the location opening into the chamber. Egress of gas from the chamber is permitted by means in gaseous communication with the radially-inward interior region of the chamber.

In accordance with another embodiment of the invention, a method of removing gas in an acyclic machine from liquid metal situated in a gap between a rotor collector ring and a housing encircling the ring, comprises rotating the rotor collector ring so as to impart tangential velocity to the liquid metal in the gap and conducting the liquid metal from the gap to a chamber contained in, and rotating with, the rotor collector ring. The liquid metal conducted to the chamber is thus collected in the chamber. At a radially-inward location of the chamber, displaced gas having floated to the surface of the liquid metal in the chamber is drawn off, and liquid metal from which entrained gas has thus been separated is returned to the gap through an opening at a radially-outward location of the chamber.

BRIEF DESCRIPTION OF THE DRAWINGS

The features of the invention believed to be novel are set forth with particularly in the appended claims. The invention itself, however, both as to organization and method of operation, together with further objects and advantages thereof, may best be understood by reference to the following description taken in conjunction with the accompanying drawing in which:

The single FIGURE is a cross-sectional view of apparatus embodying the invention and illustrative thereof.

DESCRIPTION OF TYPICAL EMBODIMENTS

In the FIGURE, a rotor collector ring 10 of an acyclic machine, encircled by a stationary electrode 11, is illustrated in section, the rotor having an axis of rotation 20. The outermost surfaces of rotor collector ring 10, except for at least a circumferential surface portion 15 thereof, are completely coated with insulation 16. Portion 15 may conveniently extend in a continuous path around the circumferential surface of the rotor collector ring.

Stationary electrically-insulating disks 13A and 13B, such as an epoxy fiberglass, arre situated on either side of rotor collector ring 10 and are tightly-fitted against electrode 11 by pressure from fastening means (not shown). Electrode 11 may comprise a stator collector ring or, as shown in B. D. Hatch application Ser. No. 625,168, filed Oct. 23, 1975, and assigned to the instant assignee, may comprise an intermediate electrode situated between aligned rotor and stator collector rings. The radially-innermost portion of electrode 11 is coated with insulation 17 on all but at least a portion 18 thereof. Electrode 11 and disks 13A and 13B together form a housing which surrounds rotor collector ring 10 but is spaced apart therefrom by a gap.

A circumferential passageway 21 formed by the gap between rotor collector ring 10 and electrode 11 extends completely around rotor collector ring 10. This passageway connects with radial passageways 23 and 25 formed by the gap between stator collector ring 10 and electrode 11 on either side of rotor collector ring 10, and also connects with a circumferential passageway 30 that extends a short distance into electrode 11. A plurality of tubular passageways, such as passageway 31, disposed circumferentially about, and connecting to, circumferential passageway 30, conduct liquid metal raially-outward into a plurality of radially-directed passageways, such as passageway 33 in disk 13A, which empty into a chamber 22 contained in rotor collector ring 10. Both passageways 23 and 33 open into chamber 22 at location 19. A passageway 24, which conveniently may be directed generally radially, is situated at the radially-outward portion of chamber 22 to permit liquid metal flow from the chamber through rotor collector ring 10 to passageway 21. Additionally, an opening 26, which conveniently may be directed generally axially, is situated near the radially-inward portion of chamber 22 to permit gaseous communication between the chamber and passageway 25. At least a portion of passageway 21 over a predetermined radial arc is always completely filled with liquid metal 12.

In operation, armature current flows between rotor collector ring 10 and electrode 11, passing through liquid metal 12 in passageway 21 between uninsulated surface 15 of rotor collector ring 10 and uninsulated surface 18 of electrode 11 as indicated by the dotted arrow. Those skilled in the art will recognize that the size, shape and axial position of each of uninsulated surfaces 15 and 18 may be selected to comply with design requirements.

Flow of current through liquid metal 12 in passageway 21 creates a Lorentz force tending to expel liquid metal from the passageway, thus moving the liquid metal in the direction indicated by the solid arrow. As a result, a mean differential liquid metal head height $h$ exists in passageways 25 and 23 regardless of rotational speed and/or direction of rotor collector ring 10 rotation.

Rotor rotation causes turbulence in the liquid metal in passageways 23 and 25, since centrifugal force tends to throw liquid metal radially-outward on the insulated radial surfaces of rotor collector ring 10 while stationary disks 13A and 13B create a frictional drag on liquid metal tending to be moved by rotation of the rotor collector ring. Consequently, cover gas employed in the machine is churned into the liquid metal, producing an emulsion of gas entrained in liquid metal. The ingested gas is detrimental to operation of a liquid metal current collector, however, since the gas-liquid phase mixture that results can develop into a heavy foam and ultimately a paste-like composition. If the ingested gas is not removed, the liquid metal acquires an undesirably high electrical resistance level as the foam develops, thus rapidly degrading performance of the apparatus.

Although the Lorentz force tending to pump liquid metal through passageway 21 also pumps liquid metal into passageway 23, the liquid metal head height in passageway 23 is insufficient to effectuate flow in any significant amount into chamber 22 when the rotor is turning in either direction, due to centrifugal force on the insulated radial surfaces of rotor collector ring 10. Consequently, liquid in each of passageways 23 and 25 remains further outward, radially, on the insulated surfaces of rotor collector ring 10 than on the inner surfaces of stationary disks 13A and 13B, and the mean liquid level in passageway 23 is located radially outward of the opening into chamber 22. However, during emergency reversals of rotor velocity, when rapid deceleration of the rotor is immediately followed by rapid acceleration thereof, liquid metal may overflow from passageway 23 into chamber 22 since the minimal centrifugal force occurring during the brief interval of rotor velocity reversal, extending from when rotor velocity is changed from a very low value in one direction to a very low value in the opposite direction, is insufficient to counterbalance completely the relatively large Lorentz force induced during that interval.

Although Lorentz force-induced flow of liquid metal containing entrained gas into chamber 22 may occur during emergency reversals of rotor velocity, the major cause of such flow is hydraulic pressure produced by centrifugal force. If rotor collector ring 10 is rotating at a sufficiently high speed, liquid metal containing entrained gas flows into chamber 22 through passageway 33 due to centrifugal force imparted to the liquid by rotation of the outermost circumferential surface of the rotor collector ring. This rotation imparts a tangential velocity to liquid metal in passageway 21 adjacent the rotor collector ring which moves liquid metal from passageway 21 into circumferential passageway 30. The liquid metal thus accelerated enters passageway 31 and continues flowing through passageway 33 into chamber 22.

When liquid metal, which may contain entrained cover gas, is introduced into chamber 22 during rotation of the rotor collector ring, the liquid metal collected in the chamber tends to flow through passageway 24 under the influence of centrifugal force and gravity, into passageway 21. The entrained gas in the liquid metal contained in chamber 22, being of lower density than the liquid metal, tends to be displaced by the liquid metal and therefore rises (i.e., moves radially inward) to the surface of the liquid metal in chamber 22, from whence it escapes, in its gaseous state, through a radially-inward opening in chamber 22. In this fashion, entrained cover gas is separated from the liquid metal, enabling continuing reuse of the liquid metal in current collector apparatus. The liquid-gas phase separation apparatus of this invention is therefore useful in liquid metal current collector apparatus of the type described and claimed in the aforementioned B. D. Hatch application Ser. No. 625,168, filed concurrently herewith and assigned to the instant assignee.

If desired, the discharge portion of passageway 33 may be directed partially in the direction of forward rotation of the rotor collector ring in those applications where the rotor is intended to turn exclusively, or at least primarily, in the forward direction. By so doing, greater efficiency of the acyclic machine may be realized since the impact of the liquid metal against the interior of chamber 22 is in such direction as to reduce its drag upon the rotor collector ring which is turning in the same direction.

Cooling of self-contained liquid metal current collectors of the type intended for use with the instant invention is provided by an externally-supplied fluid (not shown), not by the liquid metal itself. Such externally-supplied fluid may typically comprise a dielectric, such as a dehydrated oil, allowing all of the collector rings in an acyclic machine, each operating at its own different voltage level, to be cooled by a common body of cooling fluid. The cooling system is thus greatly simplified.

The foregoing describes simple and compact apparatus for separating entrained gas from the liquid metal of the current collector assembly of an acyclic machine and returning liquid metal thus purified to the current collector site. The separation process is performed completely within the interior of the machine and allows simplified cooling of the liquid metal.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. A phase separator for removing ingested gas from liquid metal in the liquid metal current collector of an acyclic machine comprising:

a rotor current collector ring enclosing a fluid chamber therein; a housing surrounding said rotor collector ring and spaced apart therefrom by a predetermined gap forming first and second passageways, said first passageway extending radially along one side of said chamber to a location opening into said chamber and said second passageway extending circumferentially between said housing and said rotor current collector ring, said rotor current collector ring including an opening through its radially-outermost circumferential region permitting liquid communication between the interior region of said chamber and said second passageway;

a third passageway formed in said housing to permit flow of liquid metal from said second passageway to said location opening into said chamber; and means in gaseous communication with the radially-inward interior region of said chamber to permit egress of gas from said chamber.

2. The apparatus of claim 1 including insulating means on the outer circumferential surface of said rotor collector ring and the inner circumferential surface of said housing defining said predetermined gap, said insulating means on said inner circumferential surface of said housing having an opening therein to permit passage of armature current through liquid metal between the outer circumferential surface of said rotor collector ring and the uninsulated portion of said inner circumferential surface of said housing.

3. The apparatus of claim 1 including insulating means on the outer circumferential surface of said rotor collector ring and the inner circumferential surface of said housing defining said predetermined gap, and insulating means on each of said surfaces having an opening therein to permit passage of armature current through liquid metal between each of said surfaces.

4. The apparatus of claim 1 wherein said third passageway includes a portion radially-aligned with the outer circumferential surface of said rotor collector ring.

5. The apparatus of claim 2 wherein said third passageway includes a portion radially-aligned with the outer circumferential surface of said rotor collector ring.

* * * * *